US011148627B2

(12) United States Patent
Korona et al.

(10) Patent No.: US 11,148,627 B2
(45) Date of Patent: Oct. 19, 2021

(54) CHILD SEAT WITH, AIRBAG, PRETENSIONER SUPPRESSION

(71) Applicant: Key Safety Systems Inc., Sterling Heignts, MI (US)

(72) Inventors: Tammy Marie Korona, Clinton Township, MI (US); Michael John Moore, Attica, MI (US)

(73) Assignee: KEY SAFETY SYSTEMS, INC., Sterling Heights, MI (US)

( * ) Notice: Subject to any disclaimer, the term of this patent is extended or adjusted under 35 U.S.C. 154(b) by 104 days.

(21) Appl. No.: 16/474,467

(22) PCT Filed: Dec. 20, 2017

(86) PCT No.: PCT/US2017/067540
§ 371 (c)(1),
(2) Date: Jun. 27, 2019

(87) PCT Pub. No.: WO2018/125708
PCT Pub. Date: Jul. 5, 2018

(65) Prior Publication Data
US 2019/0344741 A1 Nov. 14, 2019

Related U.S. Application Data

(60) Provisional application No. 62/440,479, filed on Dec. 30, 2016.

(51) Int. Cl.
*B60R 21/015* (2006.01)
*B60N 2/00* (2006.01)
*B60R 22/415* (2006.01)

(52) U.S. Cl.
CPC ........ *B60R 21/01556* (2014.10); *B60N 2/002* (2013.01); *B60R 21/01512* (2014.10); *B60R 22/415* (2013.01)

(58) Field of Classification Search
CPC ........ B60R 21/01556; B60R 21/01522; B60N 2/002
See application file for complete search history.

(56) References Cited

U.S. PATENT DOCUMENTS

| 5,385,313 A * | 1/1995 | Fujimura | ................ B60R 22/34 242/377 |
| 5,831,342 A | 11/1998 | Vivacqua | |
| 5,941,560 A | 8/1999 | Vanwambeke | |
| 6,109,556 A * | 8/2000 | Kopetzky | ............. B60R 22/415 200/61.58 B |
| 7,377,463 B2 * | 5/2008 | Morgan | ................ B60R 22/415 242/382 |

(Continued)

*Primary Examiner* — James A English
(74) *Attorney, Agent, or Firm* — Meunier Carlin & Curfman LLC

(57) ABSTRACT

A child seat (56) detecting means employing a magnet and sensor (141) for detecting whether a child seat (56) is mounted on the passenger seat (14, 15). A controller (40) in response to a signal from the sensor (141) will prevent activation of a pretensioner or belt tightener (65) from tensioning the seat belt or webbing (55) which is often positioned about or through the child seat (56) and/or for preventing an inflator (34) from expanding an airbag (26) when a child seat (56) is detected on either the front or rear passenger seat (14, 15).

11 Claims, 7 Drawing Sheets

(56) References Cited

U.S. PATENT DOCUMENTS

2010/0117438 A1* 5/2010 Takao ............... B60R 22/34
                                                  297/475
2013/0334355 A1   12/2013 Vanwambeke
2015/0360642 A1*  12/2015 Lee ................. B60R 22/405
                                                  242/383.2

* cited by examiner

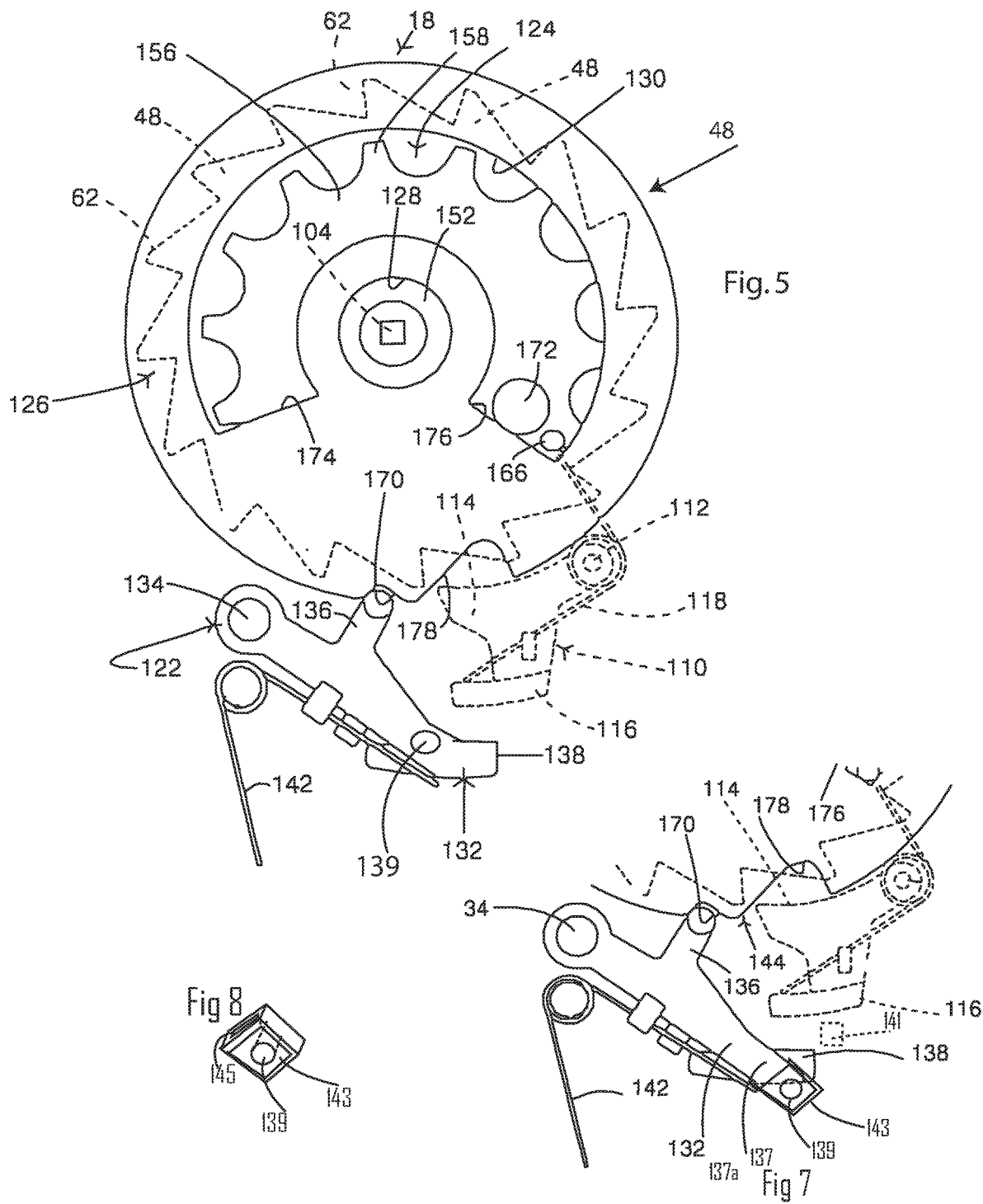

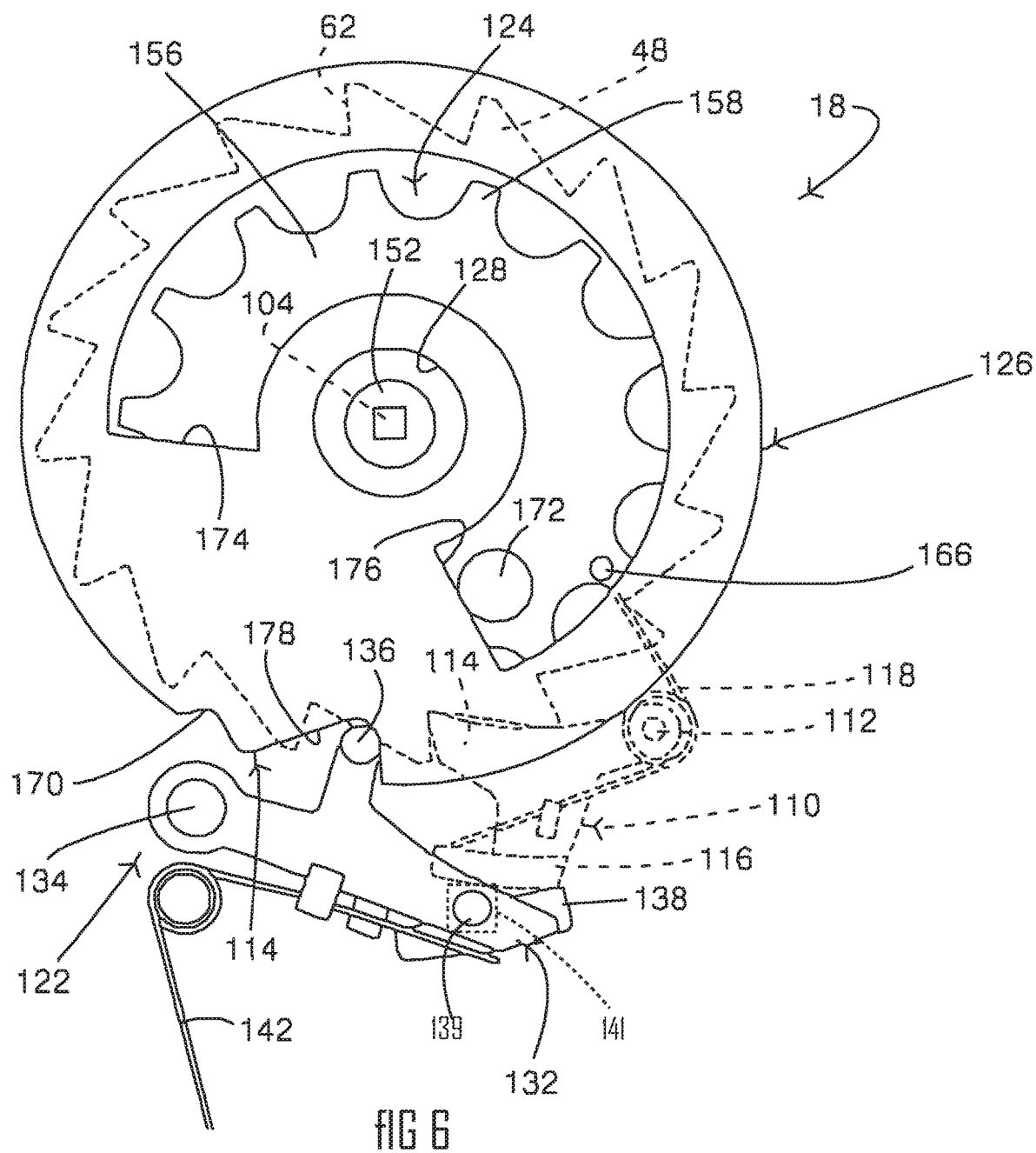

CHILD SEAT WITH, AIRBAG, PRETENSIONER SUPPRESSION

BACKGROUND AND SUMMARY OF THE INVENTION

EU-NCAP regulations include injury criteria requirements for occupants seated in rear seats. The use of pretensioners or belt tighteners as they are also called in conjunction with the energy management (in general load limiters or torsion bars) will be needed to ensure the highest NCAP rating to satisfy global regulations. The activation of belt tighteners could cause excessively high load on a child's chest upon deployment. To mitigate these types of injuries, belt tighteners or pretensioners should be turned-off when a child is secured in a child seat.

RH (right hand) passenger (front row) seating positions within the North American (NA) market segment use a retractor that presently is locked through an ALR-CHOM (child holdout mechanism) when used in conjunction with a child seat. The use of a child seat can often be used using a belt tension sensor or seat track sensor that is used to verify whether an actual child seat has been installed.

This belt tension sensor in-turn sends a no-fire signal to all of the energetics (pyro pretensioners and frontal airbags) at this front seating position. If a belt tightener and airbag is used for a passenger in the rear seat these could also be deactivate if a child seat is present. The ALR-CHOM mechanism switches the operational mode of the retractor to an always locked mode of operation thus removing the ability for webbing to be extracted (payed out) of the retractor. In the present invention when the webbing is fully extracted from the ELR/APR retractor, an ALR cam moves a pawl when the operation of the retractor changes from ELR operation to ALR operation.

More specifically the invention comprises a child seat detecting means employing a magnet and Hall effect sensor for detecting whether a child seat is mounted on the passenger seat. A controller in response to a signal from the Hall sensor will prevent activation of a pretensioner (or belt tightener) from tensioning the seat belt (or webbing) which is often positioned about or through the child seat and/or for preventing an inflator from expanding an airbag when a child seat is detected on either the front or rear passenger seat. In addition to a Hall sensor for following sensors can also be used in conjunction with a controller: a microswitch and/or a reed sensor.

BRIEF DESCRIPTION OF THE DRAWINGS

FIGS. 4-6 illustrate the positions of various components of a seat belt retractor for selectively activing the CHOM/ALR mechanism to shift the retractor between operation in an ELR mode and operation in an ALR mode;

FIGS. 7 and 8 show an alternate embodiment of the invention.

DETAILED DESCRIPTION OF THE INVENTION

Figure 1:
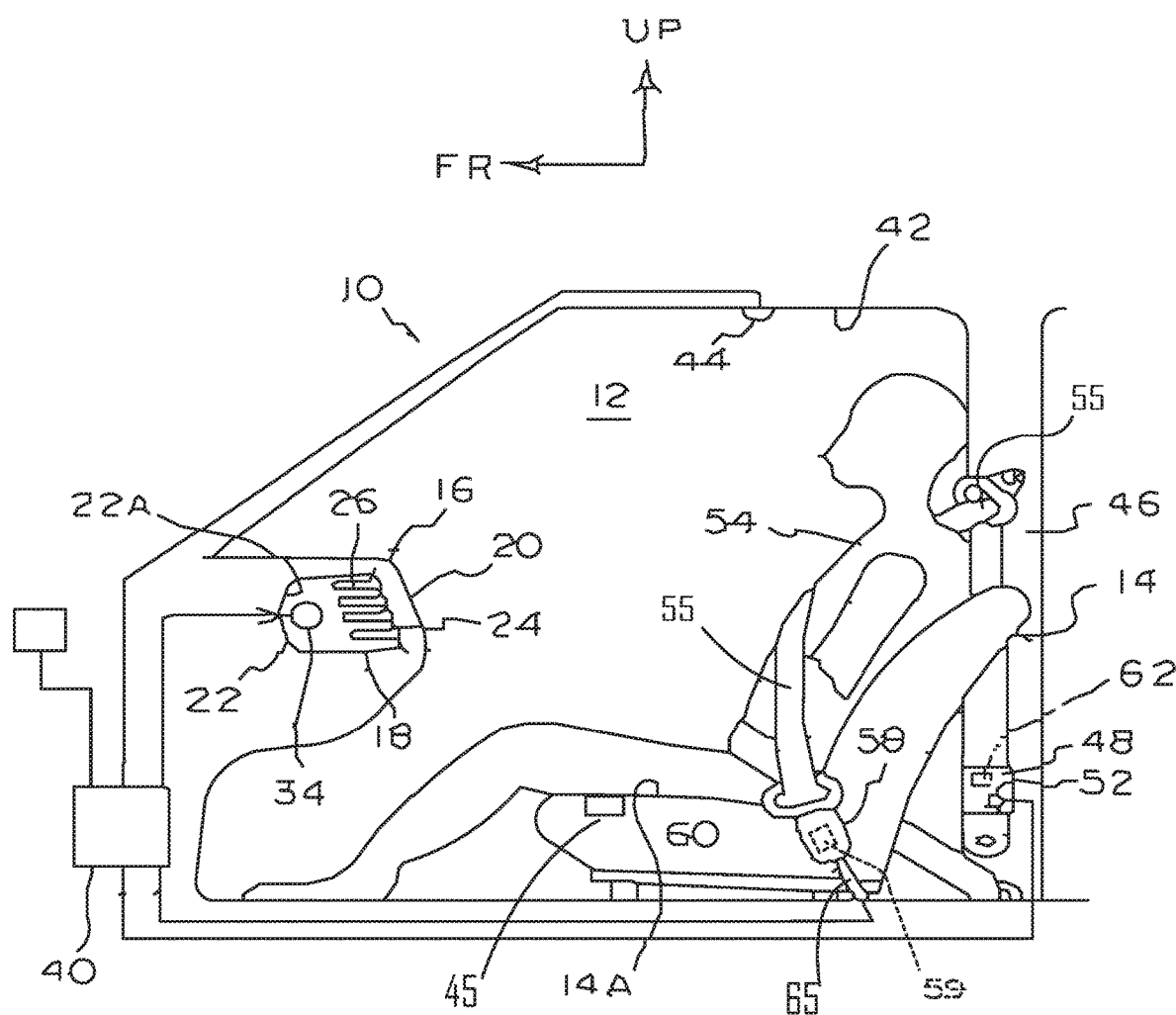
FIG. 1 is a schematic side view showing an airbag module for a front passenger seat according to an embodiment of the present invention.

An airbag should protect a passenger sitting on the front passenger seat who is larger than a predetermined size, i.e. an adult. This airbag should not operate when a small child sits on the seat cushion or booster seat or when a child is placed in a child seat mounted on a seat cushion of any passenger seat. Similarly, a belt tighter which is also called a pretensioner might be activated regardless of the size of the occupant or presence of a child seat.

An airbag module for a passenger seat comprises child seat detecting means for detecting whether a child seat is mounted on the passenger seat, and a controller for preventing an inflator for expanding an airbag body when the child seat detecting means detects directly or indirectly that a child is seated on or a child seat is mounted on the passenger seat.

The figures show a dashboard 16 in the vehicle interior such that it is located in front of a front passenger seat 14. An airbag module 18 for the front passenger seat 14 is disposed in the dashboard 16. The airbag module18 has a rectangular shape extending in the widthwise direction of the vehicle 10. A portion of the dashboard 16 which faces the airbag module 18 is formed to serve as an airbag cover 20 which has a rectangular shape extending in the widthwise direction of the vehicle 10.

Figure 2:
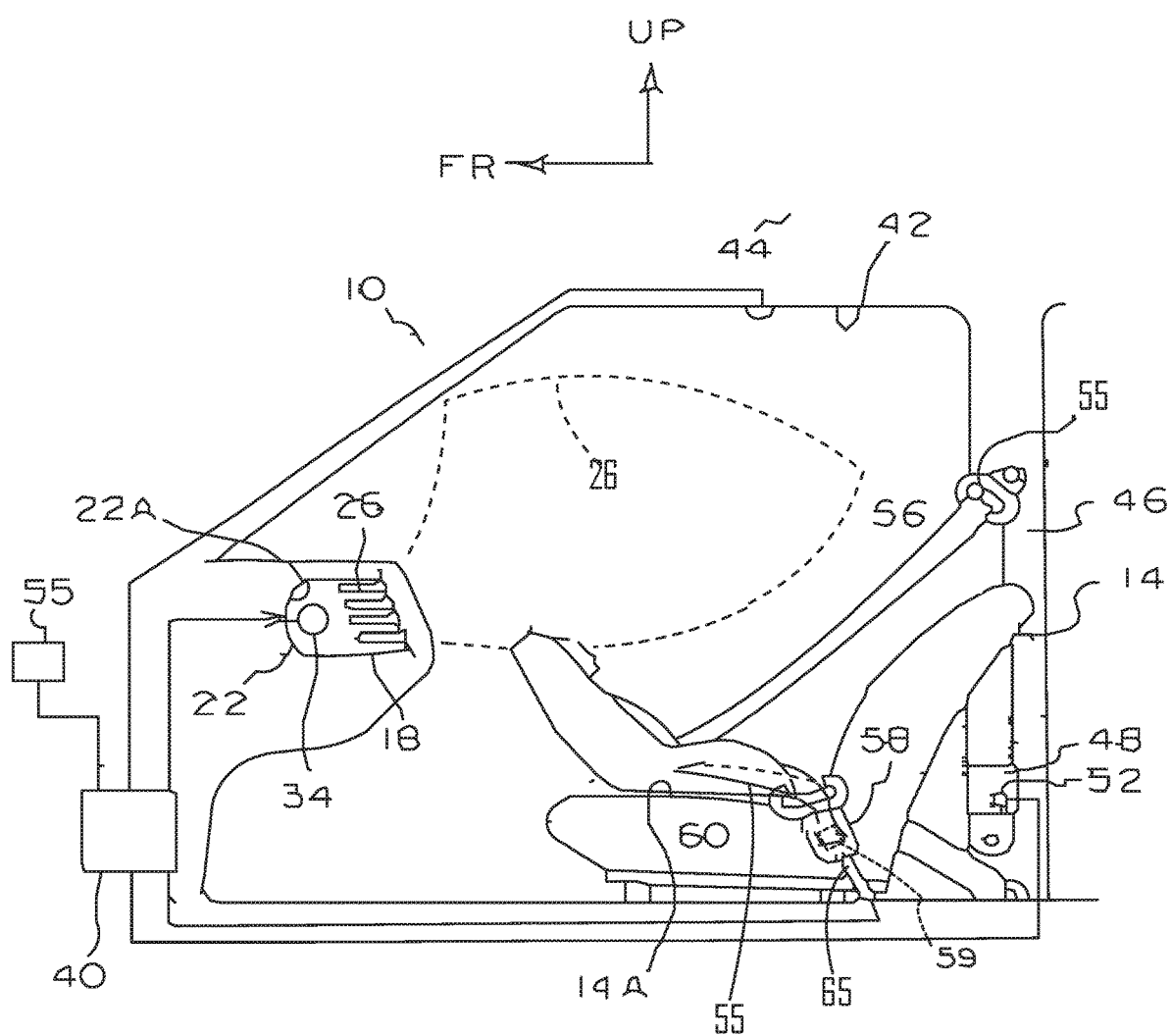
FIG. 2 is a schematic side view showing child seat is mounted on a front passenger seat at which the airbag module according to the embodiment of the present invention is provided.
Figure 2A:
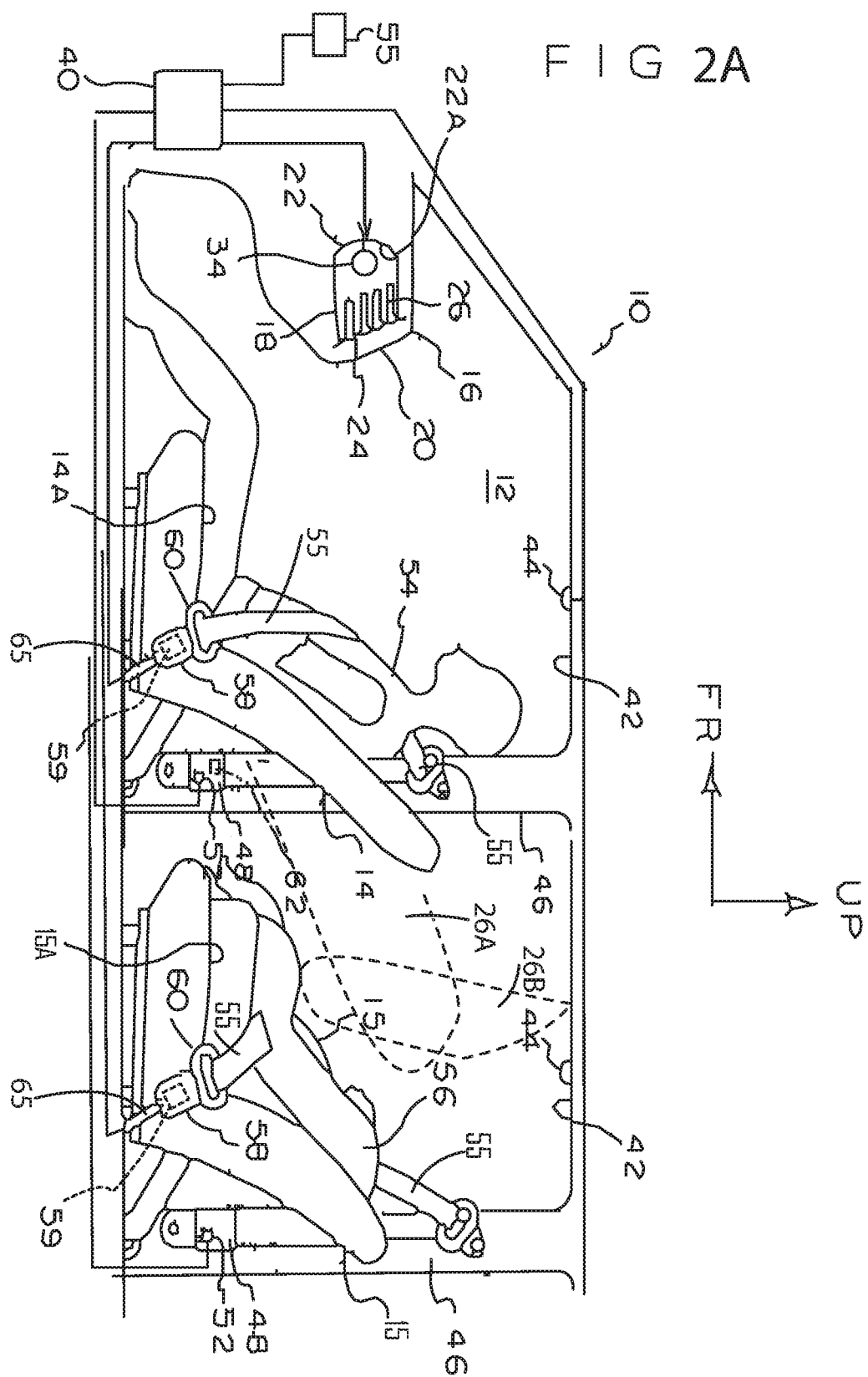
FIG. 2A is a schematic side view showing an airbag module for a front passenger seat state (as shown in FIG. 1) as well as a child seat mounted on a rear passenger seat at which the airbag module is located in the rear surface of the front seat as well as airbags located in the roof of the vehicle.

As shown in FIG. 1, a housing 22 of the airbag module 18 has a substantially U-shaped cross section when viewed from a side of the vehicle 10. An opening 24 is formed in the housing 22 such that the opening 24 is directed toward the rear of the vehicle 10 while being upwardly tilted. The circumferential edge of the opening of an airbag 26 is fixed to the inner circumference of the opening 24. A cylindrical inflator 34 which is part of the modules is disposed in the vicinity of the bottom portion 22A of the housing 22 such that the inflator 34 extends in the widthwise direction of the vehicle 10. The inflator 34 is filled with a gas or a gas generating substance and is provided with igniting means such as an igniter. Due to the gas generated, the airbag 26 housed in a folded state in the housing 22 opening inflates, and unfolds toward the vehicle interior while breaking the airbag cover 20 of the dashboard 16. FIGS. 2 and 2A show the front row passenger airbag 26 in an inflated condition. FIG. 2A also shows another airbag 26A expanding from the rear of passenger seat 14 and other airbag 26B expanding from the roof of the vehicle and located above the child seat position upon seat 15. In FIG. 2A the child seat is front facing and in FIG. 1 the child seat is rear facing. In the drawings, arrow FR indicates the forward direction of a vehicle 10 while arrow UP indicates the upward direction of the vehicle 10.

The controller 40 includes a microcomputer to controls the operation of the inflator 34 and pretensioner 65 when certain predetermined conditions are satisfied. The pretensioner 65 also acts as an anchor for the buckle.

An infrared sensor 44 serving as example of a passenger detecting means is attached to a roof 42 such that the sensor 44 is located above the seat cushion 14A of the front passenger seat 14. Another infrared sensor 44 is located above the seat cushion 15A of the rear passenger seat 15 as shown in FIG. 2A. The infrared sensor 44 is connected to the controller 40. The infrared sensor 44 detects the size and presence of an object upon the seat and outputs a signal to the controller 40. A weight sensor 45 can also be used to classify whether a child seat or passenger is upon the seat cushion. Other types of occupant classification devices can you used.

A seat belt retractor 48 is disposed on the center pillar 46, and a webbing or (safety belt or seat belt) 55 is rolled upon a spool of the seat belt retractor 48 such that the webbing can be protracted and retractably pulled out therefrom. The seat belt retractor 48 is used on many occupant safety systems in an ELR/ALR retractor. Normally the retractor operates in its ELR mode of operation permitted the webbing to be freely pulled out and retracted upon the spool. In the ELR mode of operation the retractor becomes locked up upon an emergency such as when the vehicle is a crash or impending crash and exhibits acceleration/deceleration above a predetermined amount which causes a mechanical vehicle sensor to initiate web lockup in a known manner. The ELR retractor will also become locked when the rate at which the webbing is pulled from the spool exceeds a predetermined level. The retractor includes a web sensor which activates the lock up mode when the rate of webbing protraction exceeds this level; when locked no more webbing is permitted to protract from the spool. The retractor can also be switched into its automatic locking retractor (ALR) mode which is accomplished when a sufficient amount of webbing is pulled from the spool, at which time a cam associated with the ALR mechanism permits the retractor to lock and not permit any more webbing to be released. It is in this mode of operation the webbing which protectively holds the child seat in place. In view of the above when an adult 54 sits on a passenger seat 14, 15 as shown in FIGS. 1 and 2A, the operating mode of the seat belt retractor 48 is its normal ELR (emergency locking retractor) mode. When a child seat 56 for holding a child 15 is fixed to the passenger seat 14, 15 by the webbing 55 as shown in FIGS. 2 and 2A, the operating mode of the seat belt retractor 48 is switched to the ALR (always locked retractor) mode when the person installing the child seat extends a sufficient amount of webbing from the retractor. The seat belt retractor 48 is provided with a retractor mode detecting switch 52 serving as a child seat detecting means which responds to changeover between the ALR mode and the ELR mode. The retractor mode detecting switch 52 is connected to the controller 40 so as to prevent exciting the airbag and pretensioner (belt tightener) 65 when in the ALR mode.

As is known in the art a conventional ELR retractor is fitted with a mechanical gearing mechanism which achieves the ALR mode of operation which rotates as the webbing is protected and retracted. When the webbing is sufficiently pulled out from the retractor a lever moves to an activated position to initiate the locking-up of the retractor. Patents U.S. Pat. Nos. 5,636,864 and 5,934,596 show such ALR mechanisms and are incorporated herein by reference.

The retractor 58 comprises of a spool, a belt wound on the spool, a ratchet wheel, a torsion bar interconnecting the spool to the ratchet wheel and which is capable of yielding in response to loading exerted on the belt when the ratchet wheel is locked against rotation, and an emergency locking mechanism normally operable in a released mode to permit payout of the belt and which is automatically shifted into a locked mode for locking the ratchet wheel against rotation to prevent payout of the belt in response to the occurrence of a high acceleration condition. The safety belt retractor also includes a CHOM/ALR mechanism which is normally operable in an ELR mode to permit operation of the emergency locking mechanism and which can be selectively shifted into an ALR mode for locking the ratchet wheel against rotation to prevent further payout of the belt after a predetermined length of the belt has been withdrawn from the spool. Subsequent retraction of the predetermined length of the belt shifts the holdout mechanism from its ALR mode into its ELR mode. A timing assembly associated with the CHOM/ALR mechanism functions to determine when the predetermined length of the belt has been withdrawn or retracted for controlling engagement and disengagement of a latch mechanism. A timing clutch mechanism interconnects the torsion bar to the timing assembly and is normally operable for driving the timing assembly in response to withdrawal and retraction of the belt. The timing clutch mechanism is further operable to permit relative movement between the torsion bar and the timing assembly for resetting the timing assembly to a predefined set position in response to full retraction of the belt after the torsion bar has yielded. As such, the timing clutch mechanism functions to maintain the predetermined length of the belt required for selective actuation of the holdout mechanism in a manner which is independent of yielding of the torsion bar.

Retractor 48 includes a frame 22 which is adapted to be anchored to suitable frame structure of the seat assembly or the vehicle and which has a pair of laterally-spaced walls 24A and 24B with corresponding apertures 26A and 26B formed therein. Retractor 48 also includes a spool 28 having a tubular shaft segment 30 and a pair of disc-shaped end plates 32 and 34 which are fixed to opposite ends of shaft segment 30. A throughbore 36 is formed through shaft segment 30 and end plates 32 and 34 of spool 28 and includes internal splines 38 which are formed adjacent to end plate 32. As seen, one end of a safety belt 50 is secured to shaft segment 30 of spool 28. While not shown, the other end of safety belt (webbing) 55 is anchored in a conventional fashion such that a tongue plate slidably mounted thereon can be releasably latched to a belt buckle for securing a person or a portable child seat to the vehicle seat.

To rotatably mount spool 28 to frame 22, a first end segment 42 of a torsion bar 44 is routed through aperture 26A in wall 24A, throughbore 36 in spool 28, and aperture 26B in wall 24B such that its external splines 46 mesh with internal splines 38. Thus, torsion bar 44 is fixed for rotation with spool 28. A ratchet wheel 48 is fixed adjacent to a second end segment 50 of torsion bar 44. In addition, a rewind spring 52 is provided adjacent to an outer surface of wall 24B and has one end fixed to first end segment 42 of torsion bar 44 or end plate 32 and has its opposite end fixed to frame 22. Rewind spring 52 functions to normally bias spool 28 for rotation in a first or belt-rewind (i.e., clockwise in the drawings) direction and exert a retractive force on webbing which assists in winding belt 40 onto spool 28.

Figure 3:
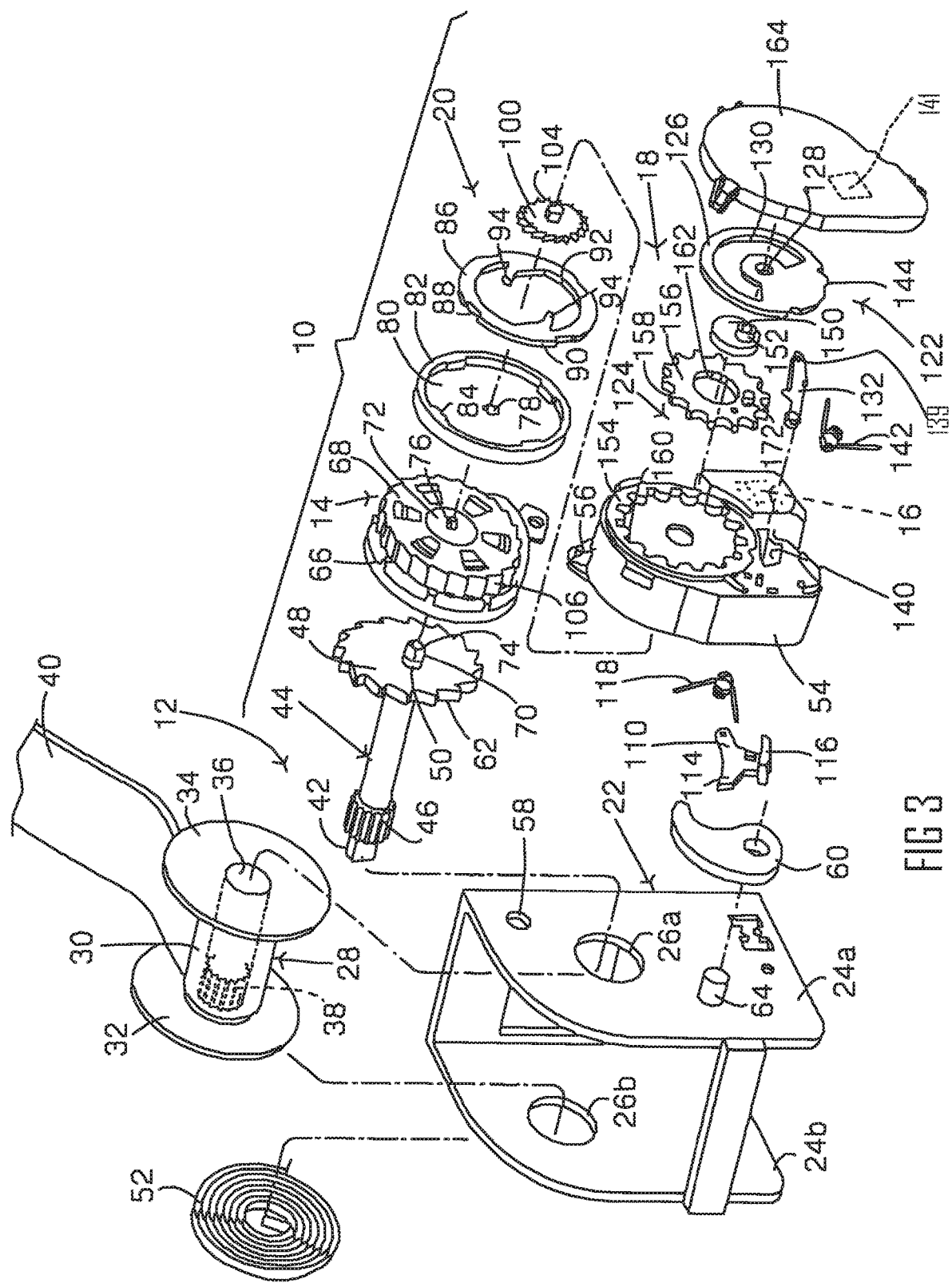
FIG. 3 is an exploded view showing the details of a typical ELR/ALR seat belt retractor.

With continued reference to FIG. 3, retractor 48 is shown to include a housing 54 which is adapted to be secured to wall 24A of frame 22 such as by posts 56 snapped into apertures 58. Housing 54 defines an enclosed space with wall 24A within which belt-sensitive emergency locking mechanism 14, vehicle-sensitive emergency locking mechanism 16, and timing clutch mechanism 20 are located. Belt-sensitive emergency locking mechanism 14 is conventional and is operably associated with ratchet wheel 48 for causing movement of a first lock pawl 60 between a first position displaced from teeth 62 of ratchet wheel 48 and a second position, engaging teeth 62 on ratchet wheel 48. First lock pawl 60 is pivotably supported on a post 64 extending from wall 24A of frame 22 and is normally biased to its first position. When first lock pawl 60 is in its first position, bi-directional rotation of spool 28 is permitted so as to define a released mode for belt-sensitive emergency locking mechanism 14. Belt-sensitive emergency locking mechanism 14 is operable to move first lock pawl 60 to its second position when the acceleration of spool 28 caused by rapid withdrawal of belt 40 exceeds a predetermined acceleration value. When first lock pawl 60 is in its second position, spool 28 is prevented from rotating in a second or belt-unwind (i.e. counter-clockwise in the drawings) direction, thereby preventing payout of safety belt 40. However, spool 28 can still be rotated in its belt-rewind direction. As such, movement of first lock pawl 60 to its second position defines a locked mode for belt-sensitive emergency locking mechanism 14. While the particular structure of belt-sensitive emergency locking mechanism 14 is not critical to the present invention, it is shown to include a lock ring 66, a toothed inertia ring 68, and speed-sensing actuator components therebetween.

A post 70 extending axially from second end segment 50 of torsion bar 44 is adapted to extend through apertures formed in lock ring 66 and inertia ring 68. A drive ring 72 has a first key (not shown) retained in a keyway aperture 74 formed in post 70 and a second key 76 which is retained in a keyway aperture 78 formed in a clutch ring 80 associated with clutch mechanism 20. Thus, clutch ring 80 is fixed for rotation with ratchet wheel 48 and torsion bar 44. Clutch ring 80 has an annular flange 82 from which a series of radial lugs 84 extend. A clutch plate 86 is adapted to be located within the chamber defined by flange 82 and includes a corresponding series of notches 88 formed in its outer peripheral surface 90. Lugs 84 are sized for retention within notches 88 such that clutch plate 86 is fixed for common rotation with clutch ring 80. Clutch plate 86 has a central aperture 92 from which a pair of cantilevered fingers 94 extend in an opposed orientation. Fingers 94 each include a root segment 96 and a tooth segment 98. Timing clutch mechanism 20 also includes a ratchet gear 100 having ratchet teeth 102 which engage tooth segments 98 of fingers 94. Tooth segments 98 of each finger 94 are radially resilient so as to maintain loaded engagement with ratchet teeth 102 and yet permit sufficient deflection to accommodate unidirectional relative rotary movement between clutch plate 86 and ratchet gear 100. Ratchet gear 100 is shown to also include a drive key 104 extending outwardly therefrom.

Vehicle-sensitive emergency locking mechanism 16 is also conventional and includes an inertia mass, shown in phantom, which responds to its own inertia when the vehicle (and retractor 48) is accelerated (positively or negatively) in excess of a predefined acceleration level for moving a second lock pawl (not shown) from a first position displaced from ratchet teeth 106 on inertia ring 68 to a second position engaged with ratchet teeth 106 on inertia ring 68. When the second lock pawl is in its first position, bi-directional rotation of spool 28 is permitted to define a released mode for vehicle-sensitive emergency locking mechanism 16. In contrast, movement of the second lock pawl to its second position permits rotation of spool 28 only in its belt-rewind direction, thereby permitting ret preventing withdrawal of belt 40 so as to define a locked mode for vehicle-sensitive emergency locking mechanism 16.

CHOM or ALR mechanism 18 is shown to include a third lock pawl 110 is mounted on a pin 112 extending from lock ring 66 for pivotal movement between an unlatched position and a latched position. Third lock pawl 110 includes a latch segment 114 and an actuation segment 116. A first torsion spring 118 acts between third lock pawl 110 and lock ring 66 for normally urging third lock pawl 110 toward its unlatched position. With third lock pawl 110 in its unlatched position, latch segment 114 is displaced from teeth 62 on ratchet wheel 48. In operation, CHOM/ALR mechanism 18 acts as a mode shifting mechanism which can be selectively activated to move third lock pawl 110 from its unlatched position to its latched position for shifting retractor 48 from operation in an emergency locking retractor (ELR) mode into an automatic locking retractor (ALR) mode. Likewise, CHOM/ALR mechanism 18 can be de-activated to move third lock pawl 110 from its latched position to its unlatched position for shifting retractor 48 from its ALR mode into its ELR mode.

Figure 4:
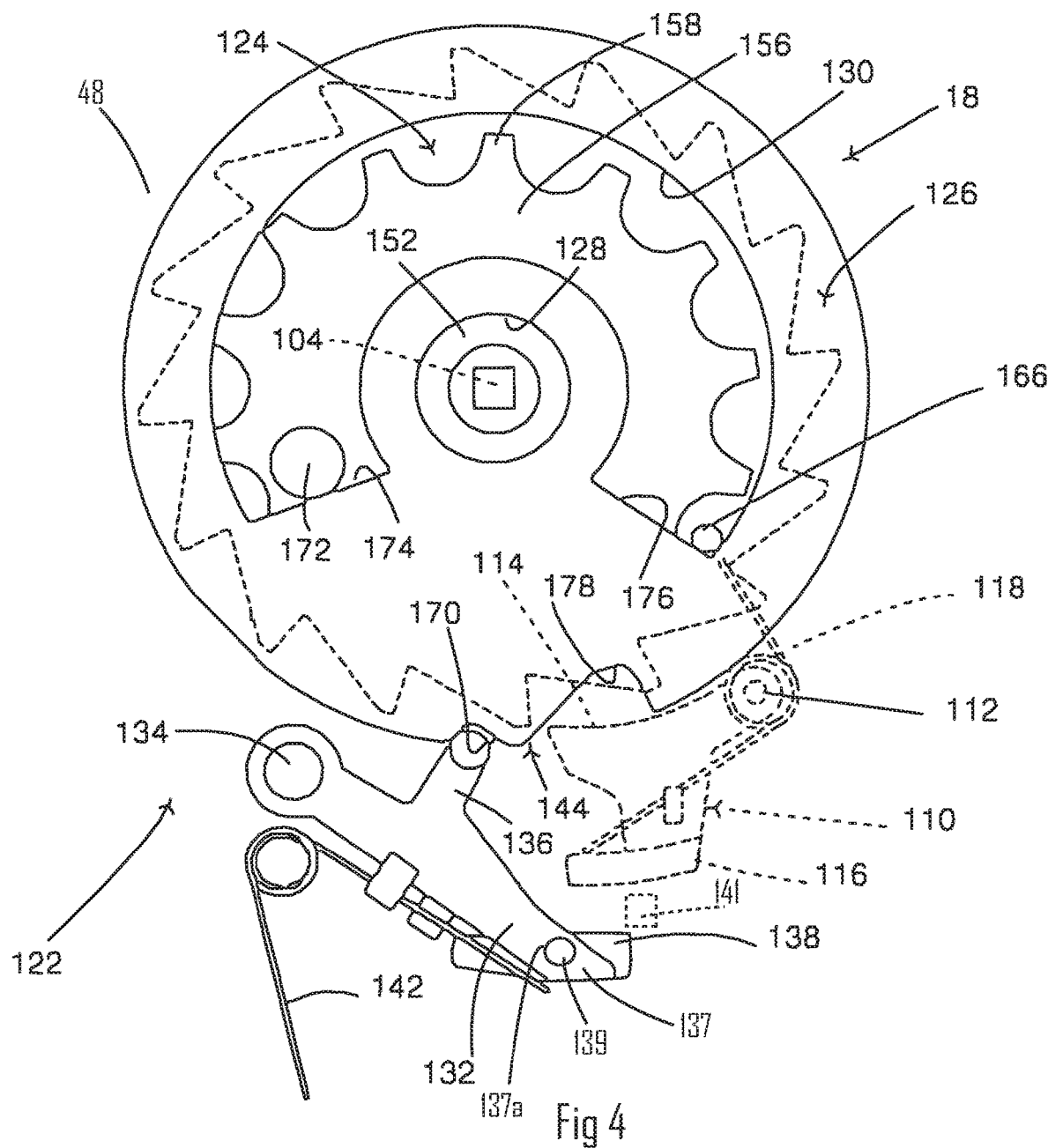

To provide means for shifting retractor 48 between its ELR and ALR modes, CHOM/ALR mechanism 18 includes a cam assembly 122 and a timing assembly 124. In general, cam assembly 124 is operable for selectively moving third lock pawl 110 from its unlatched position to its latched position, in opposition to the biasing of first torsion spring 118, after a predetermined length of belt 40 has been unwound from spool 28. Additionally, cam assembly 122 is also operable to permit first torsion spring 118 to move third lock pawl 110 from its latched position to its unlatched position after the predetermined length of belt 40 has been subsequently rewound onto spool 28. According to the embodiment shown, cam assembly 122 includes a cam wheel 126 having a central aperture 128 and an arcuate lost-motion slot 130, and a cam follower 132 pivotably supported on a post 134 extending from housing 54. Cam follower 132 includes a first leg 136, a second leg 137 and a third leg 138 which extends through an opening 140 formed in housing 54. Second leg 137 has a bore 137a into which is secured a magnet 139 and shown in FIGS. 3 and 4. A cooperating sensor 141 including a Hall effect sensor, a microswitch or a reed sensor is secured to the cover plate 164 as seen in FIGS. 3 and 4. A second torsion spring 142 acts between housing 54 and cam follower 132 for urging first leg 136 into continuous engagement with a portion of the outer peripheral edge of cam wheel 126. In particular, the outer peripheral edge of cam wheel 126 defines a cam surface 144, the contour of which controls whether or not second leg 138 of cam follower 132 engages actuation segment 116 of third lock pawl 110.

As noted, CHOM/ALR mechanism 18 also includes timing assembly 124 which controls actuation of cam assembly 122 based on whether the predetermined length of belt 40 has been withdrawn from or retracted onto spool 28. In particular, timing assembly 124 includes a gerotor-type reduction mechanism which is operable for controlling engagement of first leg 136 of cam follower 132 with cam surface 144 as a function of the length of webbing 55 which is wound on spool 28. Timing assembly 124 also includes an eccentric ring 150 having a central keyway aperture (not shown) adapted to non-rotatably receive drive key 104 of ratchet gear 100. An eccentric journal pin 152 extends outwardly from eccentric ring 150 and is adapted to be supported in central aperture 128 of cam wheel 126. Timing assembly 124 also includes a ring gear 154 integrally formed in housing 54, and a stator ring 156 having external gear teeth 158 meshed with internal gear teeth 160 of ring gear 154. Stator ring 156 also includes a central aperture 162 within which eccentric ring 150 is journally supported. Under normal circumstance, rotation of spool 28 causes concurrent rotation of ratchet gear 100 which, in turn, causes eccentric rotation of eccentric ring 150. Such rotation of eccentric ring 150 causes stator ring 156 to rotate eccentrically about ring gear 154 at a reduced ratio and in an opposite direction relative to spool 28. A cover plate 164 is adapted for attachment to housing 54 to enclose cam assembly 122 and timing assembly 124 therein.

With reference to FIGS. 4 through 6, the operational modes available with safety belt retractor 10 will now be described. In particular, FIG. 4 illustrates the components associated with CHOM/ALR mechanism 18 in a non-activated mode and safety belt 40 fully retracted to its home (i.e. stowed) position wound on spool 28. With CHOM/ALR mechanism 18 in the non-activated mode, retractor 48 operates in its ELR mode such that belt 40 can be freely withdrawn and retracted. As shown, third lock pawl 110 is held by first torsion spring 118 in its unlatched position while first leg 136 of cam follower 132 is biased by second torsion spring 142 into engagement with a first detent 170 formed in cam surface 144 of cam wheel 126 for holding cam wheel 126 in an ELR position. The depth of first detent 170 is selected to maintain leg 138 of cam follower 132 in a position displaced from actuation segment 116 of third lock pawl 110. In this position the magnet 139 is displaced from the sensor 141 in the cover (or cover plate) and the Hall effect sensor can be configured to generate a signal to the controller 40 indicative that the retractor in its ELR mode of operation the airbag and belt tightener are permitted to operate in their normal modes of operation. The sensor 141 is shown in phantom line in FIG. 4. As can be appreciated in this position the magnet and hall effect sensor can alternately be position to coact with each other in which such ELR signal is generated. In addition, a cam post 172 extending from stator ring 156 is positioned in lost-motion slot 130 of cam wheel 126 adjacent to a first terminal end 174 thereof such that timing assembly 124 is shown in an initial set position. Thereafter, as safety belt 40 is withdrawn from its stowed position, spool 28 and ratchet wheel 48 are rotated in a counter-clockwise direction which causes stator ring 156 to rotate eccentrically in a clockwise direction and at a reduced rate which, in turn, causes cam post 172 to travel within lost-motion slot 130 away from its first terminal end 174.

FIG. 5 illustrates the components of cam assembly 122 and timing assembly 124 when CHOM/ALR mechanism 18 is still in its non-activated mode and a length of belt 40 has been withdrawn for locating cam post 172 adjacent to second terminal end 176 of slot 130 while first leg 136 of cam follower 132 is maintained in engagement with first detent 170. Thus, the length of belt 40 required to rotate spool 28 sufficiently to move cam post 172 from the position shown in FIG. 4 to the position shown in FIG. 5 is the maximum length which can be withdrawn from spool 28 to maintain CHOM/ALR mechanism 18 in its non-activated mode such that retractor 48 operates in its ELR mode.

When it is desired to switch retractor 48 into its ALR mode, CHOM/ALR mechanism 18 is shifted into its activated mode by withdrawing a length of belt 40 from retractor 58 which is sufficient to move timing assembly 124 from the initial set position (FIG. 4) to an actuated position (FIG. 6). In particular, such withdrawal of belt 40 causes cam post 172 to engage second terminal end 176 of lost-motion slot 130 and rotate cam wheel 126 in a clockwise direction from the ELR position shown in FIGS. 4 and 5 to an ALR position shown in FIG. 6. Such rotation of cam wheel 126 causes first leg 136 of cam follower 132 to exit first detent 170 and enter into a second detent 178 formed in cam surface 144. When first leg 136 of cam follower 132 is biased by second torsion spring 142 into engagement with second detent 178, its second leg 138 engages actuation segment 116 of third lock pawl 110 so as to forcibly move third lock pawl 110 from its unlatched position to its latched position, in opposition to the biasing of first torsion spring 118, thereby shifting CHOM/ALR mechanism 18 from its non-activated mode into its activated mode. Since the biasing force of second torsion spring 142 is greater than that of first torsion spring 118, cam follower 132 holds third lock pawl 110 in its latched position. As noted, movement of third pawl 110 to its latched position causes latch segment 114 to move into engagement with teeth 62 on ratchet wheel 48 for preventing further payout of belt 40 while permitting subsequent retraction thereof. The length of belt 40 required to rotate spool 28 sufficiently to cause timing assembly 124 to move cam post 172 from the position shown in FIG. 2 to the position shown in FIG. 4 defines the predetermined length of safety belt 40 which must be withdrawn from spool 28 to shift CHOM/ALR mechanism 18 out of its non-activated mode and into its activated mode. As noted, with CHOM/ALR mechanism 18 in its activated mode, retractor 10 operates in its ALR mode. As can be seen in FIG. 6 in this activated mode the magnet 139 is operationally close to the sensor 141.

When it is desired to return retractor 48 to operation in its ELR mode, CHOM/ALR mechanism 18 shifted into its non-activated mode by fully retracting belt 40 to its stowed position. Such full retraction of belt 40 causes clockwise rotation of spool 28 and ratchet wheel 48 and corresponding counter-clockwise rotation of stator ring 156. This counter-clockwise rotation of stator ring 156 causes cam post 172 to move in lost-motion slot 130 and engage first terminal end 174 thereof for rotating cam wheel 126 in a counter-clockwise direction to the ELR position shown in FIG. 4. This rotation of cam wheel 126 causes first leg 136 of cam follower 132 to exit second detent 178 and enter into engagement with first detent 170, whereby second leg 138 of cam follower 132 is moved to the position displaced from actuation segment 116 of third lock pawl 110. As such, first torsion spring 118 urges third lock pawl 110 to move to its unlatched position, thereby shifting CHOM/ALR mechanism 18 from its activated mode into its non-activated mode. Further counter-clockwise rotation of cam wheel 126 past its ELR position is prevented due to engagement of a stop post 166 extending inwardly from cover plate 164 with second terminal end 176 of slot 130.

FIGS. 7 and 8 show an alternate embodiment of the invention. In FIG. 7 the magnet is held by a carrier 143 which is clipped on and/or slipped upon the extending end of leg 137. The carrier 143 and magnet are shown in isolation in FIG. 8.

Many changes and modifications in the above-described embodiment of the invention can, of course, be carried out without departing from the scope thereof. Accordingly, that scope is intended to be limited only by the scope of the appended claims.

The invention claimed is:

1. A child seat (56) detecting means comprising:
   a sensor (141) for detecting whether a child seat (56) is mounted on a passenger seat (14, 15), wherein the sensor includes a Hall sensor;
   a controller (40), wherein, in response to a signal from the sensor (141), the controller is configured to prevent activation of a pretensioner or belt tightener (65) from tensioning a seat belt or webbing (55) and/or prevent an inflator (34) from expanding an airbag (26) when the child seat (56) is detected on the passenger seat (14, 15);
   a seat belt retractor (48) that is changeable between an ALR mode and an ELR mode, wherein the seat belt retractor (48) is switchable into the ALR mode by withdrawing a length of the seat belt or webbing (55) from the seat belt retractor (48), which causes a cam wheel (126) to rotate in a clockwise direction from an ELR position to an ALR position, wherein rotation of the cam wheel (126) causes a first leg (136) of a cam follower (132) to exit a first detent (170) formed in a cam surface (144) and enter into a second detent (178) formed in the cam surface (144), and wherein a second leg of the cam follower includes a magnet (139) and the magnet is moved operationally closer to the sensor (141) in the ALR position than in the ELR position.

2. The child seat (56) detecting means according to claim 1 wherein the seat belt retractor (48) is provided with a retractor mode detecting switch (52) serving as the child seat detecting means which responds to the changeover between the ALR mode and the ELR mode, the retractor mode detecting switch (52) being connected to the controller (40) so as to prevent exciting the airbag and pretensioner or belt tightener (65) when in the ALR mode.

3. The child seat (56) detecting means according to claim 2 wherein the seat belt retractor (48) has a CHOM/ALR mechanism (18) and when the CHOM/ALR mechanism is in a non-activated mode the seat belt retractor (48) operates in the ELR mode.

4. The child seat (56) detecting means according to claim 3 wherein, to switch the seat belt retractor (48) into the ALR mode, the CHOM/ALR mechanism (18) is shifted into an activated mode by withdrawing a length of the seat belt or webbing (55) from the seat belt retractor (48) which is sufficient to move a timing assembly (124) from an initial set position to an actuated position, such withdrawal of the seat belt or webbing (55) causes a cam post (172) to engage a terminal end (176) of a lost-motion slot (130) and rotate the cam wheel (126) in the clockwise direction from the ELR position to the ALR position, wherein the seat belt retractor (48) is in the ELR mode when the cam wheel (126) is in the ELR position and the seat belt retractor (48) is in the ALR mode when the cam wheel (126) is in the ALR position.

5. The child seat (56) detecting means according to claim 4 wherein when the first leg (136) of the cam follower (132) is biased by a torsion spring (142) into engagement with the second detent (178), the second leg (138) engages an actuation segment (116) of a lock pawl (110) so as to forcibly move the lock pawl (110) from an unlatched position to a latched position, in opposition to the biasing of a second torsion spring (118), thereby shifting the CHOM/ALR mechanism (18) from the non-activated mode into the activated mode.

6. The child seat (56) detecting means according to claim 5 wherein because a biasing force of the torsion spring (142) is greater than a biasing force of the second torsion spring (118), the cam follower (132) holds the lock pawl (110) in the latched position, and movement of the lock pawl (110) to the latched position causes a latch segment (114) to move into engagement with teeth (62) on a ratchet wheel (48) for preventing further payout of the seat belt or webbing (55) while permitting subsequent retraction of the seat belt or webbing (55).

7. The child seat (56) detecting means according to claim 6 wherein the length of the seat belt or webbing (55) required to be withdrawn from the seat belt retractor (48) to sufficiently cause the timing assembly (124) to move from the initial set position to the actuated position defines the predetermined length of the seat belt or webbing (55) which must be withdrawn from the seat belt retractor (48) to shift the CHOM/ALR mechanism (18) out of the non-activated mode and into the activated mode.

8. The child seat (56) detecting means according to claim 7 wherein when it is desired to return the seat belt retractor (48) to operation in the ELR mode, the CHOM/ALR mechanism (18) is shifted into the non-activated mode by fully retracting the seat belt or webbing (55).

9. The child seat (56) detecting means according to claim 8 wherein full retraction of the seat belt or webbing (55) causes clockwise rotation of the ratchet wheel (48) and corresponding counter-clockwise rotation of a stator ring (156), the counter-clockwise rotation of the stator ring (156) causes the cam post (172) to move in the lost-motion slot (130) and engage a second terminal end (174) of the lost-motion slot (130) thereby rotating the cam wheel (126) in a counter-clockwise direction to the ELR position.

10. The child seat (56) detecting means according to claim 9 wherein rotation of the cam wheel (126) causes the first leg (136) of the cam follower (132) to exit the second detent (178) and enter into engagement with the first detent (170), wherein the second leg (138) of the cam follower (132) disengages from the actuation segment (116) of the lock pawl (110), wherein the second torsion spring (118) urges the lock pawl (110) to move to the unlatched position, thereby shifting the CHOM/ALR mechanism (18) from the activated mode into the non-activated mode.

11. The child seat (56) detecting means according to claim 10 wherein further counter-clockwise rotation of the cam wheel (126) past the ELR position is prevented due to engagement of a stop post (166) extending inwardly from a cover plate (164) with the terminal end (176) of slot (130).

* * * * *